United States Patent [19]

Takizawa et al.

[11] 4,252,917
[45] Feb. 24, 1981

[54] HYDROPHILIC POLYMER AND PROCESS FOR PRODUCING THE SAME

[75] Inventors: Minoru Takizawa, Koshigaya; Shojiro Horiguchi, Hoya; Michiei Nakamura, Sohka; Hitoshi Takeuchi, Kasukabe, all of Japan

[73] Assignee: Dainichiseika Color & Chemicals Mfg. Co., Ltd., Tokyo, Japan

[21] Appl. No.: 937,824

[22] Filed: Aug. 29, 1978

[30] Foreign Application Priority Data

Sep. 22, 1977 [JP] Japan .................................. 52/113283

[51] Int. Cl.$^3$ ............................................. C08L 53/02
[52] U.S. Cl. .................................. 525/261; 525/314; 525/440; 525/444
[58] Field of Search ..................... 260/880 B; 525/261

[56] References Cited

U.S. PATENT DOCUMENTS

| | | | |
|---|---|---|---|
| 3,441,530 | 4/1969 | Bauer | 260/880 B |
| 3,459,700 | 8/1969 | Richards | 260/880 B |
| 3,477,804 | 11/1969 | Friedl | 8/112 |
| 3,932,562 | 1/1976 | Takahashi | 260/873 |
| 3,997,487 | 12/1976 | Rees | 260/27 BB |

FOREIGN PATENT DOCUMENTS

| | | |
|---|---|---|
| 49-11757 | 3/1974 | Japan . |
| 51-125449 | 2/1975 | Japan . |
| 1179252 | 1/1970 | United Kingdom . |
| 1319418 | 6/1973 | United Kingdom . |
| 1489288 | 10/1977 | United Kingdom . |

OTHER PUBLICATIONS

E. W. Duck et al; Chemically Modified Preparation and Application, Industrie, Chimique Belge, Brussels, vol. 32, 1967, pp. 350-353, Spec. No. is : 36 Congres de Chimoe Industrielle (3 vols.).

G. E. Molau et al., Dispersion of Solid Particles in Organic Media from Multicomponent Polymer Systems; Advances in Chemical Series 99; American Chemical Society, Washington, D.C. 1971, pp. 379-396.

*Primary Examiner*—Paul Lieberman
*Attorney, Agent, or Firm*—Oblon, Fisher, Spivak, McClelland & Maier

[57] ABSTRACT

A hydrophilic polymer comprises a main component of a block copolymer and/or a graft copolymer which has at least one hydrophobic hard segment-hydrophilic segment-hydrophobic hard segment unit wherein said hydrophobic hard segment is a binding phase segment having an average molecular weight of more than 1,000 and said hydrophilic segment is a segment having a hydrophilic group connected to thioether bond on a side chain and having an average molecular weight of more than 1,000.

12 Claims, 2 Drawing Figures

HYDROPHILIC POLYMER AND PROCESS FOR PRODUCING THE SAME

BACKGROUND OF THE INVENTION

The present invention relates to a hydrophilic polymer of a block copolymer and/or a graft copolymer having special binding system of a hydrophobic hard segment and a hydrophilic segment having a hydrophilic group connected to thioether bond on a side chain and a process for producing the same. More particularly, it relates to novel hydrophilic polymers which have excellent water swelling property and water absorbing property and are useful as a water repellent, a water retainer, an antistatic agent, a perspiration absorber an antidewer, etc.

The conventional water insoluble hydrophilic polymers such as water swellable polymers and water absorbing polymers include (1) water insoluble polymers produced by modifying polyethyleneglycol (PEG), (2) polymers produced by crosslinking water soluble hydrophilic random copolymers or homopolymers by various methods in sigma bond to be water insoluble and if necessary, further chelating the water insoluble polymers, and (3) polymers produced by grafting acrylonitrile on starch, if necessary, further hydrolyzing the graft copolymer.

These hydrophilic polymers are useful as an antiwater-leakage, a water retainer, an antidewer, an antistatic agent, a cement reinforcing agent, a perspiration absorber etc.

These hydrophilic polymers have been studied for each usage. It has not been known to provide a hydrophilic polymer having high water swelling degree and water swelling force and high gel stability in preservation which can be controlled as desired.

The polymers (1)(modified PEG) have high water swelling degree but have low water swelling force which is remarkably decreased by an addition of a material having high cohesive force. Accordingly, the purpose could not be attained.

In the polymers (2), the water swelling degree is dependent upon the degree of hydrophilic groups and the crosslinking degree which are contradictory each other. The crosslinkage is chemically stable sigma bond, whereby it is not easy to treat in a post-treatment or to disperse it in a medium.

The polymer (3) of acrylonitrile grafted starch or its hydrolyzed ones have high water absorption for absorbing 50 times of water to polymer, however the polymers are perishable in storage and decompose their gel structure.

SUMMARY OF THE INVENTION

It is an object of the present invention to provide a water insoluble hydrophilic polymer having suitable water swelling degree and water swelling force.

It is another object of the present invention to provide a water hydrophilic polymer having balanced water swelling degree and water swelling force which is not perishable and can be post-treated or dispersed.

The foregoing and other objects of the present invention have been attained by providing hydrophilic polymers comprising a main component of a block copolymer and/or a graft copolymer having an average molecular weight of 2,000 which has at least one hydrophobic hard segment-hydrophilic segment-hydrophobic hard segment unit wherein said hydrophobic hard segment is a binding phase segment having an average molecular weight of more than 1,000 and said hydrophilic segment is a segment having a hydrophilic group connected to a thioether bond on a side chain and having an average molecular weight of more than 1,000.

DETAILED DESCRIPTION OF THE PREFERRED EMBODIMENTS

Figure 1:
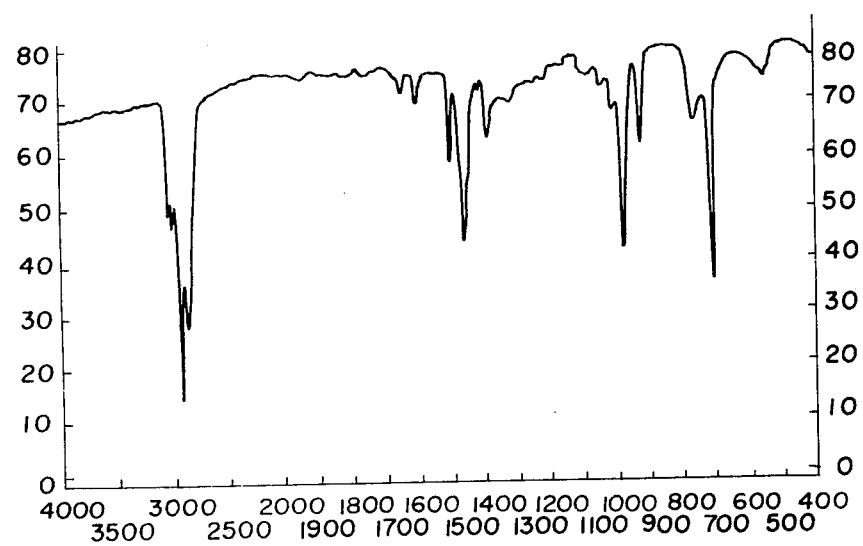

The binding phase hydrophobic hard segments include polystyrene type, poly-$\alpha$-methylstyrene type, polyethylene type, polypropylene type, polyurethane bond type, aromatic ring containing polyester type and polyamide bond type.

The hydrophilic segments include segments formed by reacting a thioalcohol group containing compound with an unsaturated group of $\alpha,\beta$-ethylene type segment such as polybutadiene, polychloroprene, polyisoprene and unsaturated polyester etc. if necessary, modifying it and forming a hydrophilic group.

The block copolymer or the graft copolymer or a mixture thereof has a specific binding system wherein at least two points of the unsaturated segment are bonded to the hydrophobic hard segments as a main component of the polymer (telechelic type, multi-type or radial type). It can contain a single type of hydrophobic hard segment-unsaturated segment.

The hydrophilic segment having a thioether bond in a side chain is produced by reacting a polymer or an oligomer having $\alpha,\beta$-ethylene type unsaturated bond with a thioalcohol group containing compound, if necessary modifying it, and forming a hydrophilic group.

The average molecular weight of each of the hydrophobic bond segment and the unsaturated segment is higher than 1,000 preferably higher than 3,000.

The ratio of the hydrophobic hard segment in the polymer is in a range of about 5 to 95% preferably about 10 to 80%.

The thioalcohol group containing compound used in the preparation of the hydrophilic segment has hydrophilic property or is modified to a derivative having hydrophilic property.

Suitable thioalcohol group containing compounds include thioglycolic acid, thiohydroacrylic acid, thiolactic acid, thiomalic acid, thioethanolamine, $\beta$-diethylaminoethyl mercaptane, $\beta$-diethylaminoethyl mercaptane, $\beta$-diethylaminopropyl mercaptane, $\beta$-nitroethyl mercaptane, thioglycol, thiophenol, thiocresol, thiosalicyclic acid etc. The thioalcohol group containing compounds having a terminal carboxylic group include the derivatives of metal salts, ammonium salts, organic amine salts, esters, urethanes and amides of the carboxylic acids.

The metal salts can have metals in groups I, II or III of the periodic table and especially alkali metals.

The organic amine salts include primary, secondary and tertiary amines, alkanol amines and morpholine.

The thioalcohol group containing compounds further include the compound produced by reacting the terminal carboxylic group with isethionic acid, sarcosine, aminomethanic acid, taurine, N-methyltaurine, polyoxyethylene alkyl ether, polyoxyethylamine, N,N'-dialkyl ethanolamine ($C_1$–$C_4$), polyethyleneglycol or the like.

The terminal amino group of the thioalcohol group containing compound can be modified to mineral acid salts, organic acid salts, amide bonds, secondary, tertiary and quaternary amine salts. The mineral acids include hydrochloric acid, phosphoric acid, sulfuric acid etc. The organic acids include formic acid, acetic acid, butyric acid, lactic acid, palmitic acid, oleic acid, stearic acid etc.

The thioalcohol group containing compounds further include derivatives of isethionates, oxycarboxylic acids and salts thereof, oxysulfonic acids and salts thereof, alkyl halides such as methyl chloride, acid anhydrides such as phthalic anhydride, succinic anhydride, maleic anhydride and salts, ethylenechlorohydrine and ethyleneoxide.

The thioalcohol group containing compounds having terminal alcoholic hydroxyl group include sulfates, nitrates and phosphates, thereof, and derivatives of acid anhydrides such as phthalic anhydride, succinic anhydride and maleic anhydride, and salts thereof, α-sulfofatty acids such as α-sulfostearic acid, α-sulfopalmitic acid and salts and esters thereof.

The process for an addition of the thioalcohol group containing compound to the unsaturated group of the α,β-ethylene type segment, can be the conventional addition reactions. Sometimes, the addition reactions for the unsaturated group can be completed without any catalyst depending upon high activity of the unsaturated group. However, in general, it is preferable to use a radical initiator such as azobis isobutyronitrile, azobiscyanovaleric acid, benzoylperoxide, lauroylperoxide, cumene hydroperoxide, methyl ethyl ketone peroxide, ammonium persulfate, and alkali metal persulfate, hydrogen peroxide etc.

The amount of the initiator is in a range of 0.1 to 10 wt.% preferably 0.5 to 5 wt.% to the reactive polymer.

The solvents used in the reaction are dependent upon the kinds of the block copolymer and/or the graft copolymer.

Suitable solvents include hydrocarbon type solvents such as cyclohexane, toluene, xylene, terpene, pentane, naphthene; ether type solvents such as ethyleneglycol diethyl, methyl or ethyl ethers, (diethyl cellosolve, methyl cellosolve, ethyl cellosolve) dioxane; hydrophilic solvents such as water, methanol, ethanol, isopropanol, buthanol; and chlorine type solvents such as chloroform, carbon tetrachloride or mixture thereof.

The concentration in the reaction is usually in a range of 2.5 to 50 wt.% preferably 5 to 20 wt.%.

The molar ratio of the thioalcohol group containing compound to the unsaturated group of the α,β-ethylene type segment is in a range of 5 to 100 mole%, preferably 20 to 100 mole%.

The reaction temperature is usually in a range of 20° to 150° C., preferably 50° to 100° C.

The reaction atmosphere is preferably in an inert gas flow without air or in refluxing condition at the boiling point.

The reaction time is usually in a range of 0.5 to 10 hours preferably 3 to 5 hours. After the reaction, it is possible to use it in a form of solution. However, it is usual that the object compound is obtained by removing the solvent and purifying the compound.

The resulting hydrophilic polymers impart special characteristics in comparison with the hydrophilic polymers obtained from the conventional random copolymers. For example, even though a hydrophilic group for water soluble is introduced, the polymer is not water soluble but the water swelling degree is about 50 times to the weight of the polymer.

The water swelling degree can be controlled as desired in a range of several times to about 50 times depending upon the kind and ratio of the hydrophilic group.

The polymers can be anionic, cationic, nonionic or amphoteric polymers.

In accordance with the present invention, hydrophilic polymers having specific characteristics suitable for the usages and uses can be provided.

The effects of the present invention can be attained by binding the hydrophilic segment for dissolving into water, with hydrophobic hard segments to prevent the solubilization into water.

The limitation of the introduction of the hydrophilic group can be the limitation of the break of the binding phase whereby the water swelling degree can be controlled depending upon the introduction of the hydrophilic group. As the result, even though the hydrophilic property of the polymer of the invention is significantly increased in comparison with that of the random polymer, the polymer of the invention is not dissolved into water whereby the range of the water swelling degree can be remarkably high.

Moreover, the swollen gel of the present invention is not decomposed by micro-organisms because it is not a modified natural material whereby the swollen gel can be stored for a long time. Moreover, the binding phase is not a crosslinked by in sigma bonds whereby it can be opened by a solvent or heat.

The present invention will be further illustrated by certain examples. In the examples, the words of part and % mean part or % by weight.

EXAMPLE 1

In a reactor, 15 parts of a block copolymer of a main component of polystyrene-polybutadiene-polystyrene having a polystyrene content of about 40 wt.%, and 185 parts of cyclohexane were charged and the block copolymer was dissolved by heating the mixture to the boiling point of cyclohexane, and the mixture was cooled to several °C. after purging, and then, 0.15 part of azobisisobutyronitrile was added and the mixture was heated again and 18 parts of thioglycolic acid was added dropwise during 10 to 15 minutes at the boiling point and the reaction was continued for about 5 hours at the boiling point. As the result, the reaction mixture having milky and fluorescent color was obtained. The reaction mixture was cooled to 35° to 40° C. and 80 parts of methanol containing 10% NaOH was added dropwise and the reaction mixture was poured into 1500 parts of methanol and the precipitate was washed with methanol and filtered and dried to obtain about 28 parts of the white reaction product. The reaction product was pulverized to obtain powdery hydrophilic polymer.

The reaction product was analyzed by IR spectrum. FIG. 1 shows IR spectrum of the polymer as a starting material and FIG. 2 shows IR spectrum of the product having free carboxylic acid group (the sodium salt was converted to the acid form).

Figure 2:
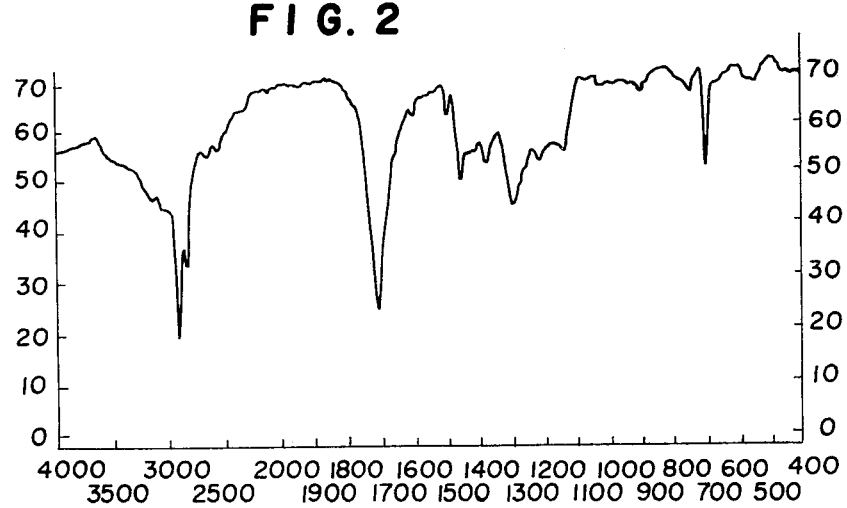

In the IR spectrum of the product of FIG. 2, the absorption of

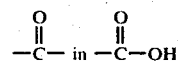

was found at 1700 cm$^{-1}$ but the absorptions of the double bond (—C=C—) of the polybutadiene segment at 970 to 980 cm$^{-1}$ and 920 cm$^{-1}$ were not found in FIG. 2. Accordingly, it is clear that the addition of thioglycolic acid to the double bond is attained.

The reaction product (sodium salt) was dipped in distilled water to test the water swelling degree and it was found that the reaction product was swollen to about 40 to 45 times.

In the test of the water swelling degree, about 0.1 g of the sample was weighed ($W_o$) and dipped in 100 ml of a distilled water for 24 hours and water remained on the surface was wipped off with a filter paper and the swollen sample was weighed (W) and the water swelling degree was given as (W/$W_o$).

EXAMPLE 2

In a reactor, 15 parts of a block copolymer having a main component of telechelic type polystyrene-polyisoprene-polystyrene having a polystyrene content of about 20 wt.% and 185 parts of cyclohexane were charged. In accordance with the process of Example 1, 0.15 part of lauroyl peroxide and 19.5 parts of thioglycolic acid were added dropwise to perform the reaction and 85 parts of methanol containing 10% NaOH was added dropwise and the reaction product was precipitated in methanol and washed with methanol and filtered and dried to obtain about 19 parts of the reaction product. The reaction product was pulverized in powdery form. The water swelling degree of the reaction product was about 50 times.

EXAMPLE 3

In the cyclohexane solution obtained by the reaction of Example 1, 35 parts of triethanol amine was added and the mixture was refluxed until distilling off 3.5 parts of water. The reaction mixture was poured into 1000 parts of water and cyclohexane was evaporated under heating and stirring whereby the polymer was precipitated. The precipitate was cooled and filtered and dried at 35° to 40° C. under a reduced pressure to obtain 50 parts of the reaction product.

The water swelling degree of the acetic acid salt of the reaction product was about 10 times.

EXAMPLE 4

In a reactor, 15 parts of a block copolymer having a main component of telechelic type polystyrene-polybutadiene-polystyrene having a polystyrene content of about 30 wt.% and 100 parts of toluene and 100 parts of cyclohexane were charged. In accordance with the process of Example 1, 0.15 part of azobisisobutyronitrile and 12.1 parts of thioglycol were added dropwise and the reaction was performed and the solvent was removed from the reaction mixture to obtain the reaction product. The water swelling degree of the product was about 2 times.

The reaction product was modified by sulfuric acid esterification, an acylation or an esterification with sulfuric acid, succinic anhydride or α-sulfopalmitic acid. The products and salts thereof had excellent water swelling degree.

EXAMPLE 5

In a reactor, 15 parts of a block copolymer having a main component of telechelic type polyethyleneterephthalate-polyethylene-maleate-polyethyleneterephthalate having a polyethylene maleate content of about 70 wt.% obtained by condensing polyethyleneterephthalate having two terminal alcoholic hydroxyl groups with polyethylenemaleate having two terminal carboxyl groups and 100 parts of toluene and 85 parts of dioxane were charged and the mixture was heated to the boiling point and it was purged with nitrogen and the mixture was heated to 100° C. and 0.075 part of azobisisobutyronitrile was added and 7 parts of thioglycolic acid was added dropwise and the reaction was performed at 100° C. for 3 hours. The reaction mixture was cooled to 40° C. and 30 times of methanol containing 10% NaOH was added dropwise and the mixture was stirred for 2 hours and poured into a large amount of methanol and it was kept in one day and the precipitate was washed with methanol and filtered and dried to obtain 20 parts of the reaction product. The water swelling degree of the product was about 5 times.

EXAMPLE 6

In a reactor, 15 parts of a block copolymer having a main component of telechelic type polyurethane-polyethylenemaleate-polyurethane having a polyethylene maleate content of about 80 wt.% obtained by reacting polyurethane having two terminal isocyanate groups obtained from 4,4'-diphenylmethane diisocyanate and ethyleneglycol with polyethylene maleate having two terminal alcoholic hydroxyl groups and 0.1 part of lauroyl peroxide, 100 parts of tetrahydrofuran and 50 parts of toluene were charged and the mixture was heated to 60° C. in nitrogen gas flow and 7.8 parts of thioglycolic acid was added dropwise and the reaction was continued for 5 hours and the reaction mixture was cooled to 35° C. and 34 parts of methanol having 10% NaOH was added dropwise and the mixture was stirred for 1 hour and the reaction mixture was poured into a large amount of methanol to precipitate the reaction product. The product was washed with methanol and filtered and dried to obtain about 19 parts of the product. The water swelling degree of the product was about 10 times.

EXAMPLE 7

A block copolymer having a main component of telechelic type polystyrene-polybutadiene-polystyrene (polystyrene content of 40%) was dissolved in cyclohexane and the addition of thioglycolic acid to the unsaturated double bond of the polymer was performed in the solution and then, the product was neutralized with a mixture of potassium t-butoxide containing methanol-methylethyl ketone-t-butanol (3:8:1) to obtain a dispersion of fine hydrophilic polymer (potassium salt of carboxylic acid:solid content of 14%).

EXAMPLE 8

A block copolymer having a main component of telechelic type polystyrene-polyisoprene-polystyrene (polystyrene content of 40%) was dissolved in cyclohexane and the addition of thioglycolic acid to the unsaturated double bond of the polymer was performed in the solution and then, toluene (0.3 times of cyclohexane) was added and the product was neutralized with a mixture of sodium hydroxide-methanol-methyl ethyl ketone-dioxane (1:1:1) to obtain a dispersion of fine hydrophilic polymer having sodium salt of carboxylic acid (solid content of 21.5%).

EXAMPLE 9

In accordance with the process of Example 5, except using 21 wt. parts of a block copolymer having a main component of multi-type [(polyethyleneterephthalate)(-polyethylenemaleate)]$_{\overline{m}}$(polyethyleneterephthalate (n=2 to 4) having a polyethylenemaleate content of about 50 wt.% obtained by condensing polyethyleneterephthalate having two terminal alcoholic hydroxyl groups with polyethylenemaleate having two terminal carboxylic groups, an addition of thioglycolic acid to the block copolymer was performed with azobisisolbutyronitrile in a mixed solvent of toluene and dioxane and then, the reaction mixture was neutralized with a methanol solution of NaOH and the product was precipitated from methanol and then, it was filtered, washed and dried to obtain 25 wt. parts of the reaction product. The water swelling degree of the product was about 2 times.

EXAMPLE 10

In accordance with the process of Example 2, except using 24 wt. parts of a graft copolymer of natural rubber-polystyrene having a polystyrene content of about 50 wt. % obtained by graft polymerizing styrene onto kneaded natural rubber with benzoylperoxide, an addition of thioglycolic acid to the graft copolymer was performed with lauroyl peroxide in a mixed solvent of cyclohexane and toluene (50:50) and then, the reaction mixture was neutralized with a methanol solution of NaOH and the product was precipitated from methanol and then, it was filtered, washed and dried to obtain 35 wt. parts of the reaction product and the product was pulverized. The water swelling degree of the product was about 20 times.

EXAMPLE 11

| | |
|---|---|
| Powdery polymer of Example 1 | 1.5 parts |
| Block copolymer of telechelic type polystyrene-polybutadiene-polystyrene (polystyrene content of 40 wt. %) | 4 parts |
| Naphthene type processing oil | 6 parts |

The mixture of the components was heat-melted at 160° to 170° C. and molded in a form of tape. The product was adhered on the segment for a shield processing whereby excellent water leakage resistance was attained.

The powdery hydrophilic polymer was blended and kneaded with each of natural rubber, isoprene rubber, nitrile rubber, ethylene-propylene-rubber or butyl rubber at ratio of 50:50 on a roll mill at 40° to 80° C. to obtain each master batch of the rubber composition.

The mixture was diluted with each rubber to 2.5 times on the roll mill to obtain a sheet containing the hydrophilic polymer and the rubber at a ratio of 20:80 by weight. A piece was sampled from the sheet and the master batch and the piece was dipped into a distilled water for 2 days and the water swelling degree was measured. The results are as follows.

| Kind of rubber | Diluted product | Master batch |
|---|---|---|
| Natural rubber | 9.2 times | 17.7 times |
| Isoprene rubber | 9.9 times | 39.6 times |
| Nitrile rubber | 9.4 times | 24.9 times |
| Ethylenepropylene rubber | 7.5 times | 17.6 times |
| Butyl rubber | 8.8 times | 28.3 times |

These compositions were useful as a caulking compound and a sealant with the other additives.

EXAMPLE 12

The product of Example 2 was blended and kneaded with butyl rubber. Excellent water leakage resistance was found and the composition was useful as a sealing composition.

When the product of Example 10 was used, excellent water leakage resistance was imparted.

EXAMPLE 13

The product of Example 3 was blended and kneaded with polyethylene to obtain a composition having excellent antistatic property.

When the product of Example 9 was used, excellent antistatic property was imparted.

EXAMPLE 14

The product of Example 4 had excellent adhesive property to glass and had antifogging effect.

EXAMPLE 15

The product of Example 5 was added to polyester fiber to obtain a composition having excellent antistatic effect.

EXAMPLE 16

The product of Example 6 was added to a leather to obtain effects of air permeability and perspiration absorbability.

EXAMPLE 17

The dispersion of the fine hydrophilic polymer of Example 7 was admixed with a toluene solution containing 15% styrene-butadiene rubber (styrene content of 23.5%) to obtain paint type hydrophilic polymer compositions.

| Content of hydrophilic polymer in dried sheet | 50% | 20% |
|---|---|---|
| 14% dispersion of fine hydrophilic polymer | 51.7 parts | 21.1 parts |
| 15% toluene solution of styrene-butadiene rubber | 48.3 parts | 78.9 parts |
| Total | 100 parts | 100 parts |

The paint composition was coated on a parting sheet (peeling) and dried in air for one night and predried at 70° C. and dried at 100° C. for 2 hours to obtain a water swellable styrene-butadiene rubber type film.

A piece (8×2 cm) was sampled from the film and the water swelling degree was measured. The results are as follows.

| Sample film | Weight of film | Water swelling degree after 30 minutes | Water swelling degree after 1 hour |
|---|---|---|---|
| Film containing 50% of hydrophilic polymer | 0.162 g | 8.8 times | 14.5 times |
| Film containing | | | |

| Sample film | Weight of film | Water swelling degree after 30 minutes | Water swelling degree after 1 hour |
|---|---|---|---|
| 20% of hydrophilic polymer | 0.213 g | 4.1 times | 5.5 times |

A tricot cotton fabric was disposed on a parting paper (peeling) and a dispersion of the hydrophilic polymer and the styrene-butadiene rubber (20:80) (a fabric treating agent type) was immersed in the tricot cotton fabric and dried in air and predried at 60° C. and dried at 80° C. for 3 hours. The weight ratio of the fabric to the polymers in the dried product was 1:1.5.

A piece was sampled from the product and dipped into a distilled water to swell it. The rough tricot fabric was completely clogged by the swollen polymers.

The water swelling degree of the hydrophilic polymer was about 4 times.

The hydrophilic polymer treated fabric was used as a packing material or a sealing material at each joint in a building a pipe for water supply and a tent, whereby the water leakage resistant effect by the water absorption to increase a thickness was attained to be remarkably useful.

EXAMPLE 18

The dispersion of fine hydrophilic polymer of Example 8 was prepared.

A rubber solution having a solid content of 15% was prepared by dissolving 7.5 parts of styrene-butadiene rubber (styrene content of 23.5%) and 7.5 parts of styrene-butadiene type thermoplastic resin (styrene content of 40%) in 85 parts of toluene.

A paint type hydrophilic polymer composition was prepared by uniformly mixing 15 parts of the dispersion of the hydrophilic polymer and 85 parts of the toluene solution of the rubber under stirring.

The composition was coated on a parting paper and dried to obtain the rubber sheet containing the hydrophilic polymer. The water swelling degree of the sheet was 4 times.

The paint type hydrophilic polymer composition was coated on an agricultural polyvinyl chloride film and dried to obtain a hydrophilic polymer coated film having thickness of coated layer of 100μ. A green house for accelerating and protecting germination and growth of the plants was prepared by using the coated film. The dews caused by temperature difference were not adhered on an inner surface of the coated film to prevent dews. Even though the coated layer absorbed water, the dry feeling was attained.

In the same manner, when the paint type hydrophilic polymer composition was coated on a surface of a wall or a ceiling in a house especially in a bath room, the formation of dews was prevented.

A paint type hydrophilic polymer composition was prepared in accordance with the same manner except using a solution of 15% of carboxylated vinyl chloride-vinyl acetate resin, and dibutyl phthalate (80:20) in a mixed solvent of methyl ethyl ketone and toluene (50:50) instead of the toluene solution of the rubber and adding a stabilizer for vinyl chloride.

The paint type hydrophilic polymer composition was coated on the film, the wall and the ceiling whereby the same effect for preventing the formation of dews was effectively attained.

FIG. 1 is IR spectrum of the styrene-butadiene block copolymer used as the starting material in Example 1 and FIG. 2 is IR spectrum of the hydrophilic polymer obtained in Example 1.

What is claimed is:

1. A hydrophilic polymer which comprises a main component which is a block copolymer or a graft copolymer or mixtures thereof, wherein said main component has at least one polystyrene or poly-α-methylstyrene segment-hydrophilic segment-polystyrene or poly α-methylstyrene segment structure therein, wherein said polystyrene or poly α-methylstyrene segment is a binding phase segment having an average molecular weight of more than 1,000; said hydrophilic segment is obtained by adding a thioalcohol group containing compound to the double bond of an α,β-ethylenic component, wherein said hydrophilic segment has an average molecular weight of more than 1,000; and wherein the proportion of said polystyrene or poly α-methylstyrene segment in the polymer is 5–95%.

2. A process for producing a hydrophilic polymer which comprises
adding a thioalcohol group containing compound to the unsaturated group of a block copolymer or a graft copolymer or mixtures thereof having as a main component at least one polystyrene or poly α-methylstyrene segment-unsaturated segment-polystyrene or poly α-methyl styrene segment structure;
modifying the terminal thioalcohol-containing group to a hydrophilic group if necessary; thereby
forming a hydrophilic segment having a hydrophilic group connected by a thioether bond on a side chain and having an average molecular weight of more than 1,000 and a polystyrene or poly α-methylstyrene segment having an average molecular weight of more than 1,000; wherein the proportion of said polystyrene or poly α-methylstyrene is 5–95% of the polymer.

3. A process according to claim 2 wherein the thioalcohol group containing compound is a compound having a thioether bond and a hydrophilic terminal group selected from the group consisting of carboxylic acid, sulfonic acid, salts thereof, esters thereof, amine, salts thereof and amides thereof.

4. A process according to claim 2 wherein said unsaturated segment is a polymer segment having α,β-ethylenic double bond.

5. A process according to claim 4 wherein said unsaturated segment is selected from the group consisting of polybutadiene, polychloroprene, polyisoprene and unsaturated polyester.

6. A process according to claim 2 wherein the thioalcohol group containing compound is reacted in the presence of an initiator in a solvent.

7. The polymer of claim 1 which is a block copolymer.

8. The polymer of claim 1 wherein said hydrophilic segment is obtained by reacting a thioalcohol group containing compound with a polybutadiene segment.

9. The polymer of claim 1 wherein the ratio of said polystyrene or poly α-methylstyrene segment is 10–80%.

10. The polymer of claim 1 wherein said thioalcohol group containing compound is selected from the group consisting of thioglycolic acid, thiohydroacrylic acid, thiolactic acid, thiomalic acid, thioethanolamine, β- diethyl amino ethylmercaptan, β-diethylaminopropylmercaptan, β-nitroethylmercaptan, thioglycol, thiophenol, thiocresol, thiosalicylic acid, salts thereof, esters thereof, urethanes thereof and amides thereof.

11. A hydrophilic polymer which comprises a main component which is a blocked copolymer or a graft copolymer or mixtures thereof, wherein said main component has at least one polystyrene or poly-α-methylstyrene segment-hydrophilic segment-polystyrene or poly-α-methylstyrene segment structure therein, wherein said polystyrene or poly-α-methylstyrene segment is a binding phase segment having an average molecular weight of more than 1,000; said hydrophilic segment is obtained by adding a thio-alcohol group containing-compound to the double bond of an α,β-ethylenic component selected from the group consisting of polybutadiene, polychloroprene, polyisoprene and unsaturated polyester; wherein said hydrophilic segment has an average molecular weight of more than 1,000; and wherein the proportion of said polystyrene or poly-α-methylstyrene segment in the polymer is 5-95%.

12. A process for producing a hydrophilic polymer which comprises:
adding a thio-alcohol group-containing compound to the unsaturated group of a blocked copolymer or a graft copolymer or mixtures thereof having as a main component at least one (A) polystyrene or poly-α-methylstyrene segment- (B) unsaturated segment selected from the group consisting of polybutadiene, polychloroprene, polyisoprene and unsaturated polyester-(A) polystyrene or poly-α-methylstyrene segment structure;
modifying the terminal thio-alcohol-containing group to a hydrophilic group if necessary; thereby
forming a hydrophilic segment having a hydrophilic group connected by a thioether bond on a side chain and having an average molecular weight of more than 1,000 and a polystyrene or poly-α-methylstyrene segment having an average molecular weight of more than 1,000; wherein the proportion of said polystyrene or poly-α-methylstyrene is 5-95% of the polymer.

* * * * *